United States Patent
Rüter

(10) Patent No.: US 7,066,677 B2
(45) Date of Patent: Jun. 27, 2006

(54) FASTENING ARRANGEMENT FOR PLUG CONNECTORS

(75) Inventor: Andreas Rüter, Rahden (DE)

(73) Assignee: Harting Electric GmbH & Co. KG (DE)

( * ) Notice: Subject to any disclaimer, the term of this patent is extended or adjusted under 35 U.S.C. 154(b) by 0 days.

(21) Appl. No.: 10/678,873

(22) Filed: Oct. 3, 2003

(65) Prior Publication Data
US 2004/0101355 A1 May 27, 2004

(30) Foreign Application Priority Data
Nov. 9, 2002 (DE) .............. 202 17 273 U

(51) Int. Cl.
*H01R 9/26* (2006.01)
*H01R 9/24* (2006.01)
(52) U.S. Cl. .............. 403/231; 403/361; 403/383; 403/408.1; 439/716
(58) Field of Classification Search .............. 403/231, 403/245, 361, 383, 408.1; 439/716
See application file for complete search history.

(56) References Cited

U.S. PATENT DOCUMENTS

| 5,595,507 A | * | 1/1997 | Braun et al. .............. 439/716 |
| 6,077,116 A | | 6/2000 | Yamamoto et al. ......... 439/571 |
| 6,196,869 B1 | * | 3/2001 | Kay et al. .............. 439/716 |
| 6,203,364 B1 | | 3/2001 | Chupak et al. ............ 439/527 |
| 6,354,888 B1 | | 3/2002 | Cech et al. .............. 439/716 |
| 6,575,657 B1 | * | 6/2003 | Reuter et al. ............ 403/231 |

FOREIGN PATENT DOCUMENTS

| DE | 4438921 | 11/1994 |
| DE | 19716917 | 4/1997 |
| DE | 29713237 | 7/1997 |
| DE | 29908490 | 5/1999 |
| EP | 0711004 | 9/1995 |

* cited by examiner

Primary Examiner—Daniel P. Stodola
Assistant Examiner—Ernesto Garcia
(74) Attorney, Agent, or Firm—Hayes Soloway P.C.

(57) ABSTRACT

A plug-connector body for latching-in in a switch cabinet or the like includes pin-shaped fastening elements mounted on the plug connector body for sliding into latching slits on a carrier body.

12 Claims, 5 Drawing Sheets

FASTENING ARRANGEMENT FOR PLUG CONNECTORS

FIELD OF THE INVENTION

The invention relates to an arrangement for fastening plug connectors in a carrier body, in particular an arrangement for fastening a plug-connector body to a U-shaped carrier body by means of angle elements in which said plug-connector body is held by means of a holding arrangement, pin-shaped fastening elements being disposed in said holding arrangement.

A holding device of this kind is needed in order to connect plug-connector contact inserts, which are held in a holding frame, to a carrier housing.

BACKGROUND OF THE INVENTION

DE 299 08 490 U1 indicates a holding system for various types of plug connectors, in which holding system lateral parts, which can be latched onto a base plate with a fixed holder and a displaceable holder, can be fastened to a first insulating body which can have different lengths. Holding systems for plug connectors are also known, in which a base plate holding the plug connector is held on a contact-insert holding arrangement by means of screws, although in these systems a tool is always needed for fastening purposes.

SUMMARY OF THE INVENTION

The object underlying the invention is therefore to develop a fastening device of the initially mentioned type to the effect that, for the mounting of cable connections by means of plug-in connections in a switch cabinet, the simplest and quickest possible fixing of a plug-connector body in a carrier housing is to take place by means of a tool-less fastening facility which is easy to mount and demount and cost-effective to manufacture.

This object is achieved through the fact that slits, into which the mounting arrangement can be introduced, are provided in the corner regions of the angle elements; that posts are provided underneath the slits, axially in relation to the fastening elements of the holding arrangement, said posts being disposed so as to be spaced apart from the lower edge of the slits; that the posts have a continuous opening in the longitudinal direction; that a gripping element can be pushed into the opening, said gripping element having a longitudinal bore and the ends of the pin-shaped fastening elements engaging in said longitudinal bore when the gripping element is pushed in the direction of the plug-connector body; and that the gripping element is provided with latching means which permit a pre-mounting position and a final position of the gripping elements.

The advantages achieved with the aid of the invention consist, in particular, in the fact that a plug-connector body, which is to be later plugged together with a counterplug, can first of all be inserted in a tool-less manner in a carrier body which is mounted on a so-called "hat rail", for example in a switch cabinet.

It is also of particular advantage that all the mounting parts are held in a captive manner in this system.

Attached to both fastening sides of the plug-connector body are metal holding arrangements which are provided with screws and which are each pushed into an angle element, a locking system being provided which brings about a fixed connection.

For that purpose, the metal holding arrangement is first of all pushed into a slit, which is formed by two moulded-on portions, in the corner regions of the angle elements, the ends of the screws at the same time projecting into a continuous opening in a post which is disposed underneath the slit. A gripping element which is displaceable in the post is thereupon displaced in the direction of the ends of the screws and latched in, so that the angle elements are fixedly connected to the plug-connector body.

The gripping element is advantageously held in the post with the aid of latching means, so that two latching positions are provided:

a) a pre-mounting position, in which the gripping element, which is of elongated construction, is pre-latched in the post in a lower position and, under these circumstances, still projects underneath the angle element with part of the gripping-element body; and b) a final position, in which the gripping element is pushed over the end of a screw and latched in, and terminates with the lower part of the angle element.

It is also possible, in advantageous manner, for fastening elements that can be manufactured in a more cost-effective manner, for instance pins or studs, to be inserted in the metal holding arrangements instead of the screws, in which case a captive mounting system is provided.

So that it is possible to use a certain range of tolerance of differing thicknesses of sheet-metal in the metal holding arrangements, a gripping tongue, which continuously presses the metal holding arrangement against the moulded-on portion opposite said gripping tongue, is advantageously provided in the slit between the two moulded-on portions.

The plug-connector body provided with the angle elements is then inserted in the carrier body, it being advantageously possible to push into corresponding clearances in the lateral parts of the carrier body, and latch in, laterally protruding pegs moulded onto the angle element.

One of said clearances is of horizontal design and allows the plug-connector body to be held and tilted after being pushed in, so that said body may advantageously be rotated into a favourable position for fitting the electrical conductor which is to be connected; whereas the other clearance, into which the second angle element is inserted with the aid of the lateral pegs when the plug-connector body is lowered into the horizontal, is designed with a slight inclination towards the plug-connector body in relation to the perpendicular. The plug-connector body and carrier body are held together in a detachable manner with a simple latching mechanism by means of a pawl-type nose on one of the angle elements, which nose latches onto a latching nose on a pawl mechanism on the carrier body.

An exemplified embodiment of the invention is represented in the drawings and will be explained in greater detail below. In said drawings:

DETAILED DESCRIPTION OF THE INVENTION

Figure 1:
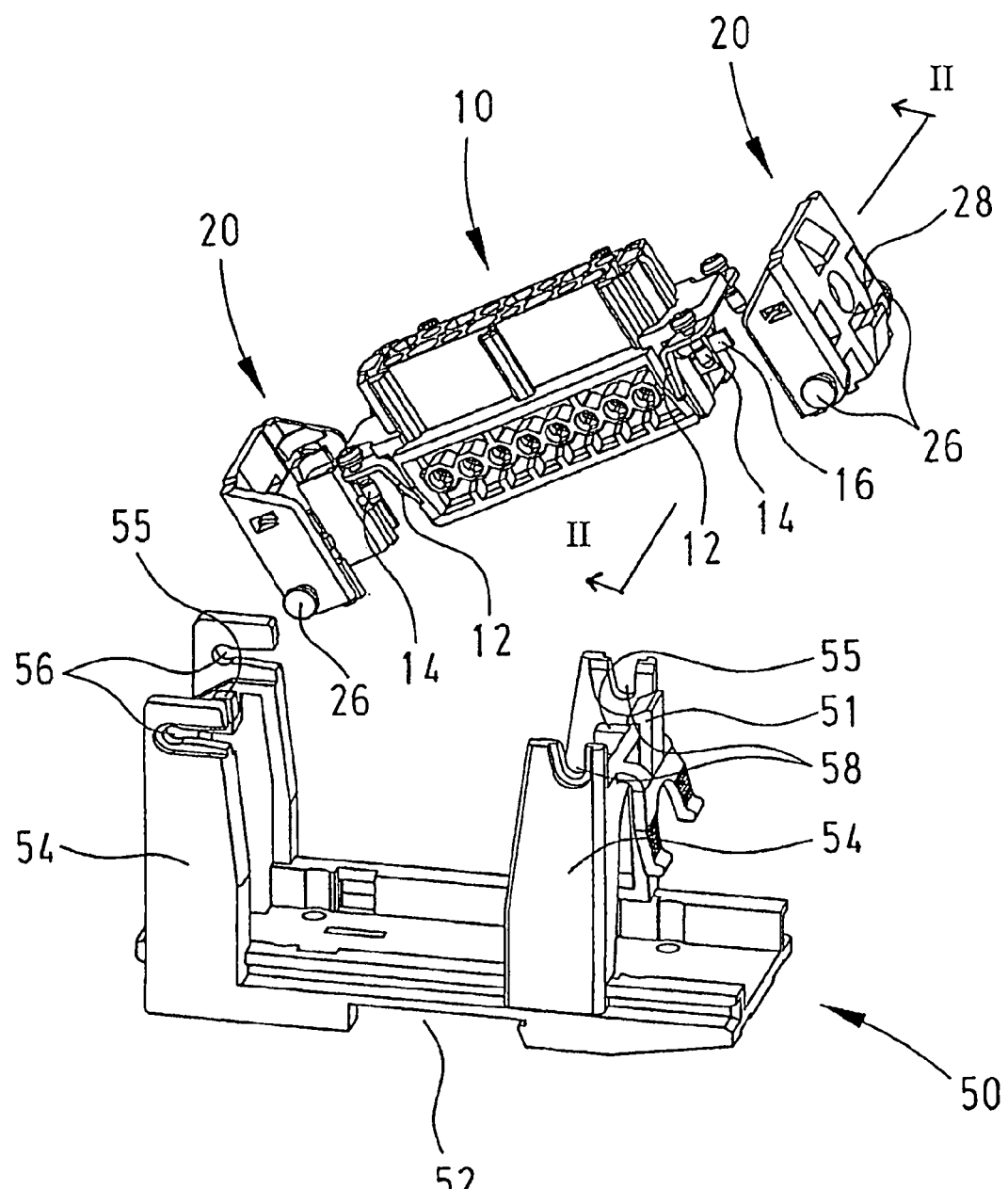
FIG. 1 shows an exploded perspective representation of a plug-connector body with a fastening arrangement on a carrier body.

FIG. 1 shows, in an exploded representation, a plug-connector body 10 with two angle elements 20 and a carrier body 50. Disposed on the outer sides of the plug-connector body are angular, electrically conductive holding arrangements 12 on which at least one screw connection for a protective earth connection 16 is provided.

Also provided in the corner regions of the holding arrangement 12 are fastening elements 14 which may be constructed as captive gripping screws, pins or studs.

The gripping screws for which provision is made in this example are held loosely, but in a captive manner, in the holding arrangements 12.

Provided on either side of the plug-connector body are angle elements 20 which can be pushed onto the holding arrangements 12 in each case.

Said angle elements are, in turn, provided with outwardly pointing pegs 26 which can be inserted in latching clearances 56, 58 in lateral parts 54 of the carrier body 50.

Said carrier body 50 is provided, for the purpose of holding it in a switch cabinet or the like, with a latching holding arrangement 52 for use on so-called "hat rails".

From this representation, it is also possible to see a further advantage of this design, namely the fact that a plug-connector body, which has been initially introduced with the aid of the pegs 26 into the latching clearances 56, can be tilted to an extent such that it is possible to carry out convenient wiring-up of the individual electrical contacts held in said plug-connector body. The plug-connector body is then tilted into the horizontal between the other two lateral parts 54 and introduced into the latching clearances 58.

The combination of the plug-connector body and the angle elements is then latched, by means of a pawl-type nose 28 on one of the angle elements 20, onto a latching nose 51 which is moulded onto a pawl mechanism on the carrier body 50.

Figure 2:
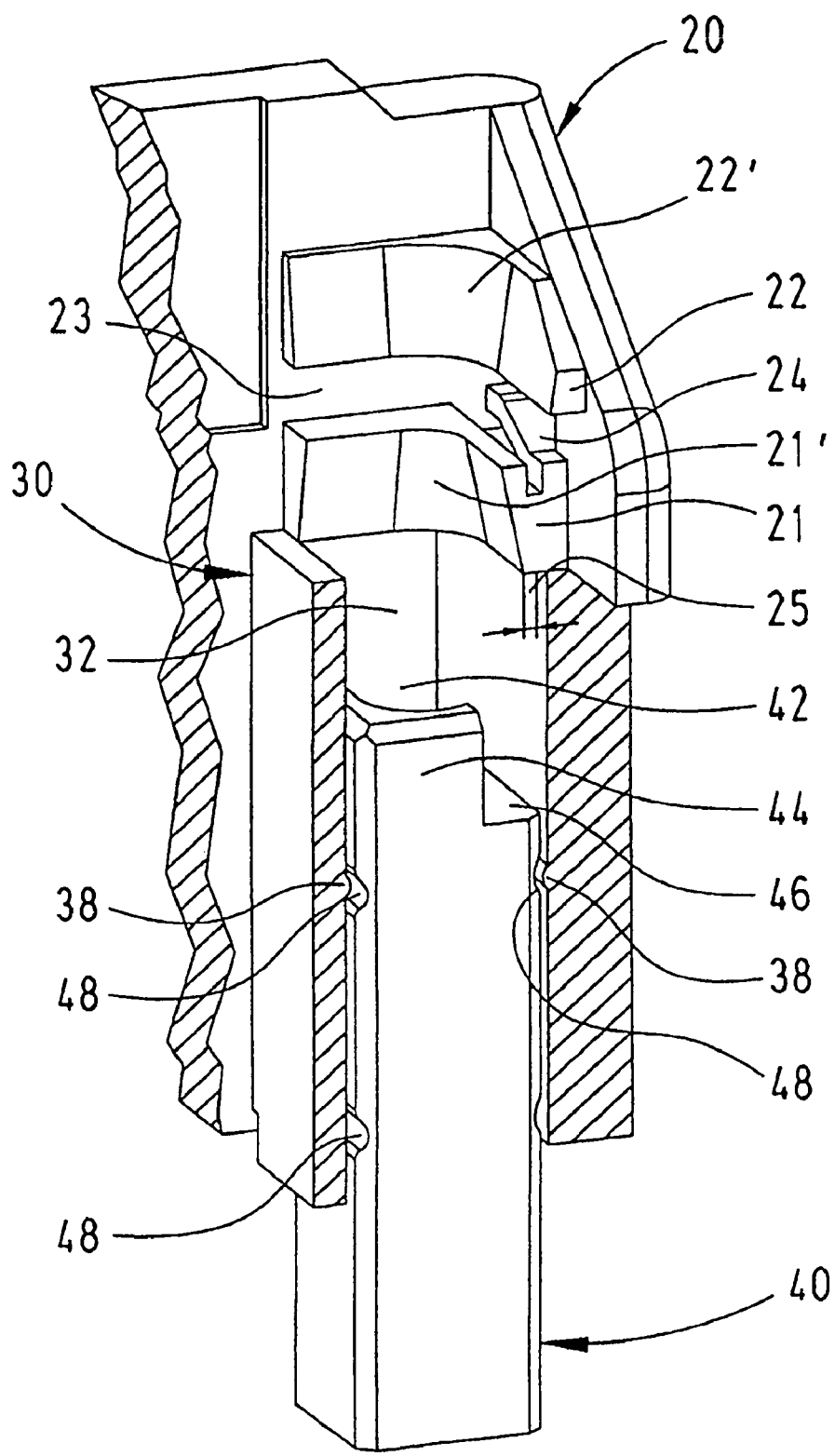
FIG. 2 shows a perspective view, in partial cross-section, of a corner region of an angle element, taken along lines II—II of FIG. 1.

FIG. 2 shows, in a detail drawing, one of the corner regions of the angle element 20, a gripping element 40 being disposed in a post 30 with a continuous axial opening 32. The position shown here corresponds to that of a pre-mounted angle element.

The elongated gripping element 40, which is square-shaped in cross-section, has an internally extending longitudinal bore 42 and, on two opposing outer sides, semicircular grooves 48 in which a semicircularly shaped elevation 38 on the inner wall of the post 30 engages, in each case, for the purpose of latching-in the gripping element.

Furthermore, that end of the gripping element 40 which points in the direction of pushing is provided with a moulded-on corner portion 44 which is carried on beyond a corner enclosing two side walls and in a manner which is prolonged in relation to the rest of the gripping element which is square in cross-section.

Since the longitudinal bore 42 extends through the gripping element 40, the inner side of the moulded-on corner portion 44 has a cylindrical wall surface that encompasses, in total, slightly more than a quarter cylinder.

Disposed above the gripping element, in the corner region of the angle element 20, is a first moulded-on portion 21 which reaches across the two sides of the corner and whose side that points towards said gripping element has an overhang 25 in relation to the wall of the post 30.

The wall surface 21' of the first moulded-on portion 21 is of inclined or conical design, pointing, with the larger diameter of the cone, towards the gripping element 40.

As can also be seen in this representation, there is provided, above the first moulded-on portion, a further, second moulded-on portion 22 which is separated by a slit 23 and approximately encompasses a quarter circle and whose wall surface 22' is likewise of conical design, although the larger diameter points towards the outside (in this case, upwards).

Disposed in the slit 23 is a gripping tongue 24 which points out of the first moulded-on portion 21, along the inner wall of the angle element and towards the second moulded-on portion 22, but without touching the latter. The gripping tongue 24 is provided in order to hold fast holding arrangements 12 with different thicknesses of material when they are inserted in the angle element 20 and, above all, to prevent slipping or vibration of the plug-connector body when in the finally mounted condition.

Figure 3:
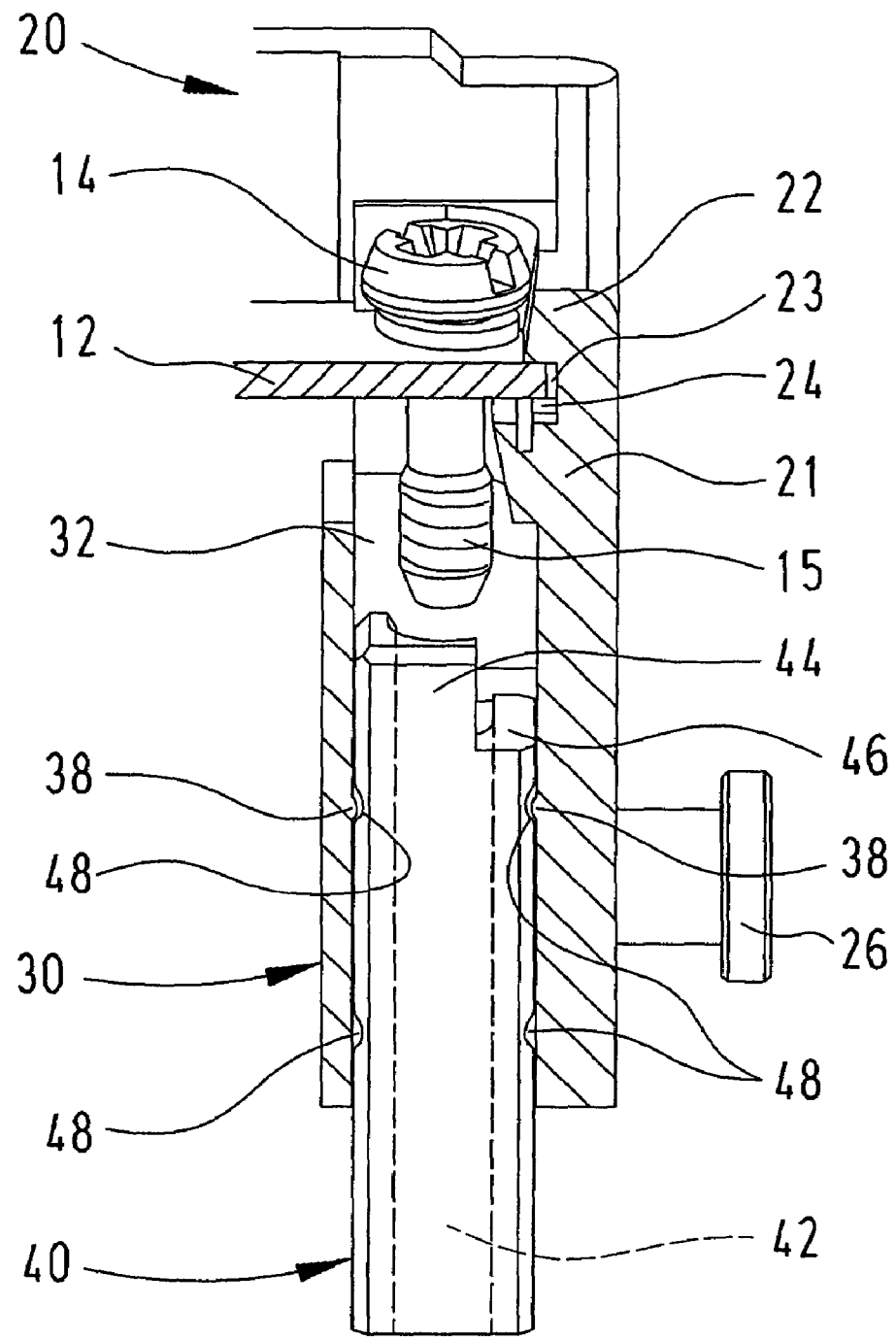
FIG. 3 shows a side elevational view, in partial cross-section, of the corner region of the angle element of FIG. 2, with a pre-mounted gripping element.

FIG. 3 shows, in another detailed representation of the corner region, how the holding arrangement 12 for the plug-connector body is pushed into the slit 23 between the two moulded-on portions 21, 22.

For a simple operation for the insertion of the holding arrangement, or of the fastening elements 14 held therein, a longitudinal clearance 34 (see FIG. 5) is provided in the wall of the post 30, so that that end 15 of the fastening element which projects underneath the holding arrangement can be, first of all, introduced laterally into the post until said holding arrangement 12 is immersed in the respective slit 23.

The longitudinal bore 42 of the gripping element 40 is positioned immediately underneath the end of the fastening element 14.

Figure 4:
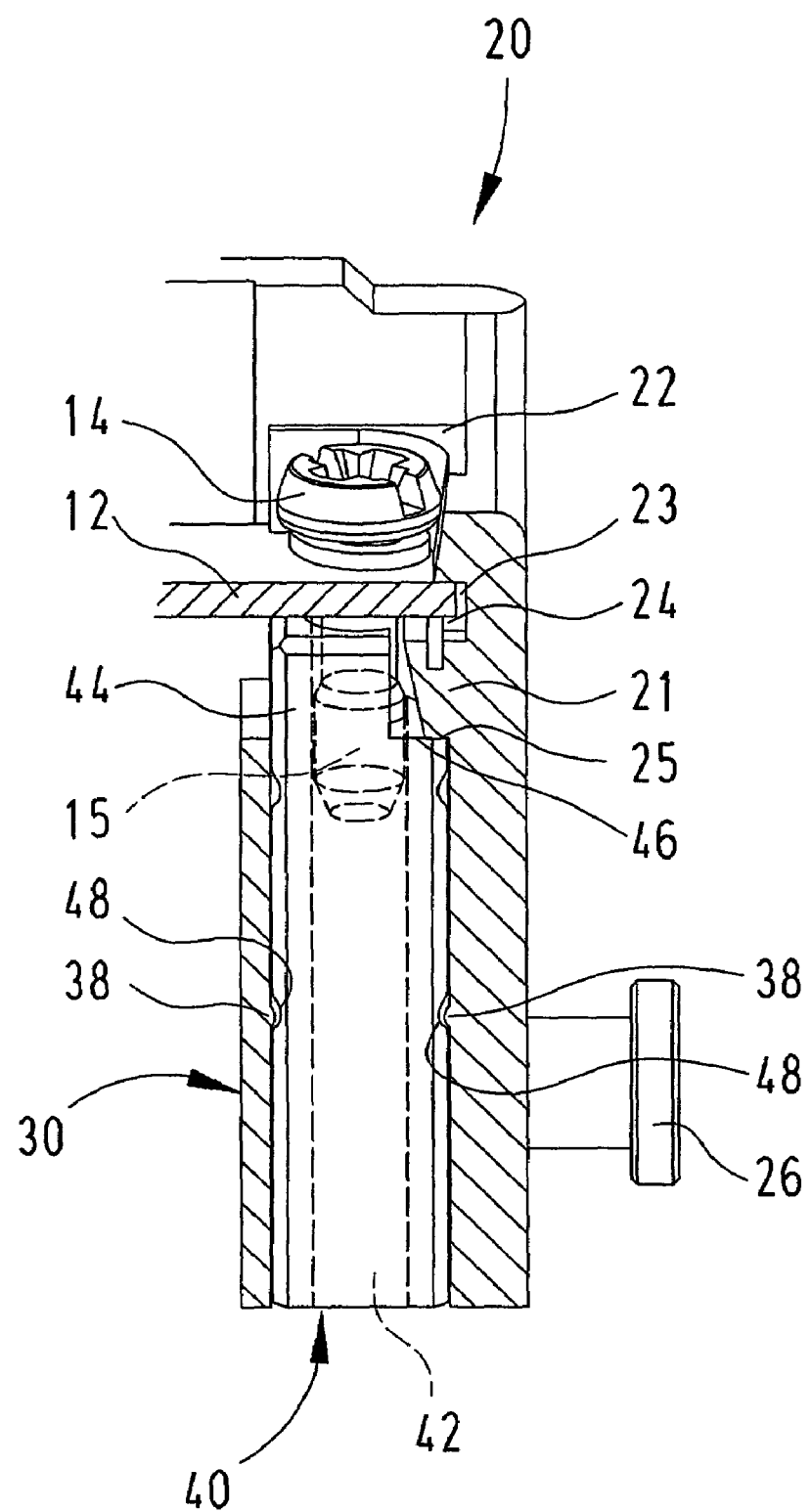
FIG. 4 shows a view similar to FIG. 3, with a gripping element in the final position.

FIG. 4 shows, as a sequel to FIG. 3, how the gripping element 40 is already displaced in the direction of the holding arrangement 12, the fastening element 14 engaging in the longitudinal bore 42 and the plug-connector body being finally secured in the angle element 20 with the latching of the elevations 38 into the grooves 48 of the gripping element 40.

The pushing-in of the gripping elements 40 which, in the mounting position, protrude out of the angle element, may take place either by hand or through the fact that the plug-connector body 10 is pressed, with the angle elements 20, onto a flat support, so that the gripping elements 40 which are provided in the corner regions and are still projecting out are displaced out of the lower, pre-mounting position, as shown in FIG. 3, and into the upper, final position.

In said final position, the gripping element 40 strikes, with the face of the shoulder 46, against the overhanging part 25 of the first moulded-on portion 21, the pressed-in end of the gripping element terminating flush with the angle element.

However, the gripping elements 40 must be fixed, by means of the moulded-on portions 55 (see also FIG. 1) disposed on the inner sides of the lateral parts 54, in their final position in the posts 30, at the latest when the plug-connector body, or rather the pegs 26 of the angle elements 20, are latched into the latching clearances 56; whereas, when the angle element 20 is pivoted into the latching clearances 58, the gripping elements are, of necessity, pressed in against the moulded-on portions 55 and latched in.

Figure 5:
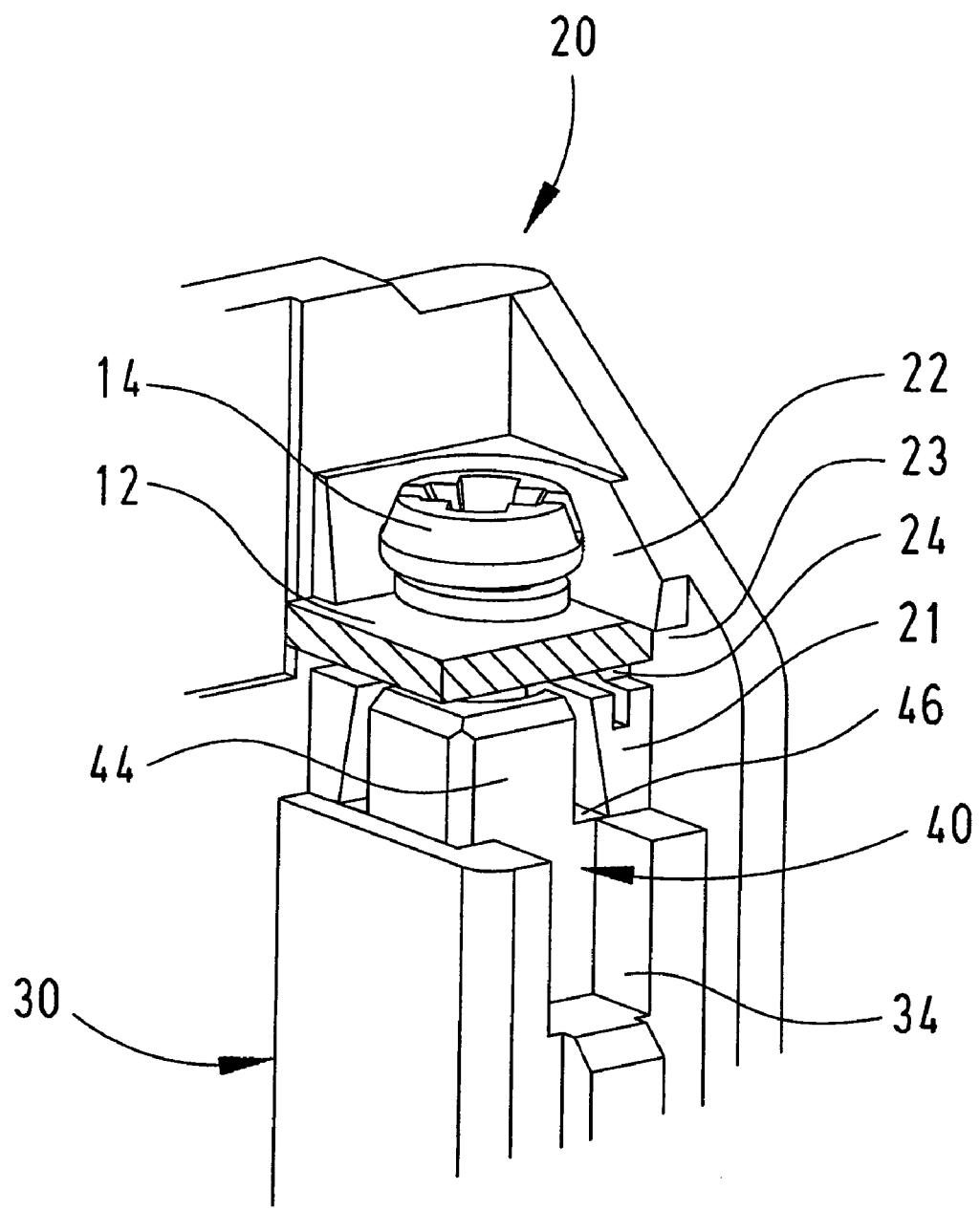
FIG. 5 shows a detailed perspective view of the corner region, with a gripping element in the final position.

FIG. 5 shows, in a perspective representation, the corner region of the angle element 20 with a holding arrangement 12 belonging to a plug-connector body, which holding arrangement has already been introduced and latched in.

Projecting out of the holding arrangement is the screw head of a fastening element 14 which is provided in the form of a gripping screw and whose lower end 15, which is no longer visible here but which is provided with a threaded portion, is already immersed in the longitudinal bore 42 of the gripping element 40, and thus fixed.

It can be clearly seen that the mounting arrangement 12 rests, by means of the gripping tongue 24 which remains only partially visible, against the lower edge of the (upper) second moulded-on portion 22.

Also visible is the functionality of the longitudinal clearance 34 in the post 30, so that a plug-connector body that is to be introduced into the angle element does not have to be inserted from above, as in the case of a screw connection, but can simply be inserted laterally in the corner regions of the angle element in the slit 23 between the first and second moulded-on portions 21, 22 and, in the process, is held fast by the gripping tongues 24 until the gripping element 40 is pushed into its final position in the post 30 and latched in at that point.

The invention claimed is:

1. An assembly comprising a plug-connector body and a U-shaped carrier body in which said plug-connector body is held to said U-shaped carrier body by angle elements attached to said plug-connector body in which pin-shaped fastening elements are disposed;
    each said angle element having fixed thereto a post having a continuous axial opening;
    wherein each of said posts includes a gripping element slidably disposed in said axial opening within said post, each said gripping element having an internally extending longitudinal bore into which one of said pin-shaped fastening elements may be engaged;
    said angle elements having slits in corner regions thereof into which portions of the plug connector body may be introduced, with said posts being disposed spaced apart from a lower edge of the slits, and an end of each pin-shaped fastening element respectfully engaging said longitudinal bore when the gripping element is pushed into the plug-connector body;
    said gripping element has a latch which permits a pre-mounting position and a final position of the gripping elements, and
    each said gripping element has a step-shaped moulded-on corner portion.

2. The assembly according to claim 1, wherein said latch is formed by semicircularly shaped elevations in the axial opening of the posts, which engage with spaced-apart grooves in the gripping element.

3. The assembly according to claim 1 wherein the slits are formed by first and second moulded-on corner portions on the angle elements which are disposed in a spaced-apart manner.

4. The assembly according to claim 3, wherein a resilient gripping tongue, which is directed towards the second moulded-on portion, is moulded onto the first moulded-on portion.

5. The assembly according to claim 1, wherein a wall of the posts has a longitudinal clearance through which ends of the pin-shaped fastening elements may be introduced laterally into said post.

6. The assembly according to claim 1, wherein the plug connector body together with the angle elements are held in the U-shaped carrier body by latches with clearances which permit pivoting of the plug-connector body relative to the U-shaped carrier body.

7. The assembly according to claim 1, wherein moulded-on portions are provided on lateral parts of the U-shaped carrier body to position the gripping elements in a final position.

8. An assembly comprising a plug-connector body and a U-shaped carrier body in which said plug-connector body is held to said U-shaped carrier body by angle elements in which pin-shaped fastening elements are disposed, wherein:
    each said angle element has fixed thereto a post having a continuous axial opening;
    each of said posts includes a gripping element slidably disposed in said axial opening within said post, each said gripping element having an internally extending longitudinal bore into which one of said pin-shaped fastening elements may be engaged;
    said angle elements having slits in corner regions thereof into which portions of the plug-connector body may be introduced, with said posts being disposed spaced apart from a lower edge of the slits, and an end of each pin-shaped fastening element respectfully engaging said longitudinal bore when the gripping element is pushed into the plug-connector body;
    said gripping element has a latch which permits a pre-mounting position and a final position of the gripping elements, and
    wherein the slits are each formed by first and second moulded-on corner portions on the angle elements, which are disposed in a spaced-apart manner.

9. The assembly according to claim 8, wherein said latch is formed by semicircularly shaped elevations in the axial opening of the posts, which engage with spaced-apart grooves in the gripping element.

10. The assembly according to claim 8, wherein a resilient gripping tongue, which is directed towards the second moulded-on portion, is moulded onto the first moulded-on portion.

11. The assembly according to claim 8, wherein a wall of the posts has a longitudinal clearance through which ends of the pin-shaped fastening elements can be introduced laterally into said post.

12. The assembly according to claim 8, wherein the plug connector body together with the angle elements are held in the U-shaped carrier body by latches with clearances which permit pivoting of the plug-connector body relative to the U-shaped carrier body.

* * * * *